April 21, 1931. B. R. BENJAMIN 1,801,996
COTTON PICKER
Filed Feb. 3, 1927 4 Sheets-Sheet 1

Inventor:
Bert R. Benjamin
By [signature]
Atty

Fig. 2.

Patented Apr. 21, 1931

1,801,996

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

COTTON PICKER

Application filed February 3, 1927. Serial No. 165,583.

This invention relates to cotton pickers, and more particularly to improvements in cotton pickers of the type employing rotary picker stems. In this type of cotton picker, the picker stems are projected into the plants as the machine is drawn along the ground; the cotton is wound upon the picker stems; and, thereafter, the wound-up cotton is subjected to the action of doffers which act to remove the cotton from the picker stems.

It is an object of this invention to provide a practical and successful cotton picker which is of novel structure and possesses many advantages in use.

It is a further object of the invention to provide a novel combination of a separator with a doffer which is preferably of the rotary type, so as to act continuously upon the cotton brought in contact therewith by the picker stems.

It is also an object of the invention to provide means for separating the picked cotton from dirt and trash before the cotton is delivered from the picker stems to a collection receptacle.

It is a further object of the invention to provide a cotton picker which is capable of picking cotton upon plants in all vertical positions in which the cotton may be located. In other words, the present invention contemplates a machine which will pick cotton from parts of the plants which may be lying upon the ground or closely adjacent thereto.

Other objects of the invention will appear as the following description proceeds.

For the purpose of illustrating the invention, an embodiment thereof is illustrated in the accompanying drawings, in which,—

Figure 3 is a detail view somewhat in the nature of a side elevation, showing a part of the drum casing broken away so as to illustrate the cooperative relations of the doffer, the separator, and the elevator;

The illustrative machine comprises drum casings 10 and 11, between which a passageway 12 is provided for cotton plants. Within each casing is a battery of picker stems, the individual picker stems being caused to travel in the direction of the arrow 13 in Figure 2 of the drawings. During its course of movement, each picker stem 14 is projected into cotton plants within the passage-way 12 and is rotated therein by mechanism hereinafter described, to wind up the cotton.

Figure 2:
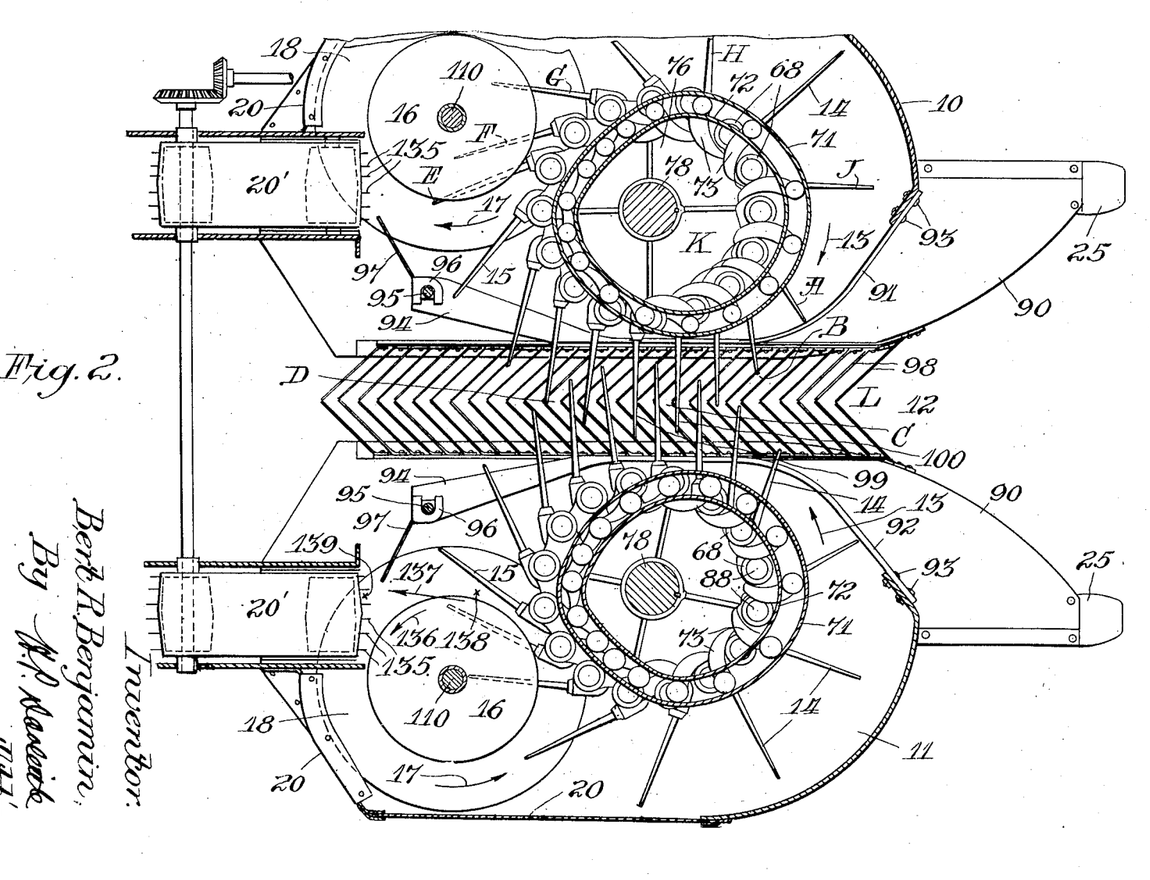
Figure 2 is a view somewhat in the nature of a horizontal section taken through the picking mechanism of the illustrative machine, showing the relationships of the picker stems, the doffers, the separator, and the elevators.

After the picker stem leaves the plant passage-way 12, it approaches a position indicated at 15 in Figure 2 of the drawings, and, as it further proceeds, it is brought into contact with means for stripping the cotton, herein shown as a rotary doffer 16 moving in the direction indicated by the arrow 17. The picker stems thereafter move thru and past the doffer and around to the starting point where they are again made ready to enter the cotton plants.

One of the great difficulties in providing a successful cotton picker lies in the necessity of eliminating a sufficient proportion of the weeds, trash and dirt which are usually gathered with the cotton by a mechanical picking device. In the present machine leaves, dirt and trash are ejected from both of the casings 10 and 11 by a separator herein shown as a rotary disk 18, preferably located at the base of the doffer. The disk 18 preferably rotates with and in the same direction as the doffer, and acts to centrifugally cause separation of the dirt and trash from the cotton by throwing the dirt and trash thru the lateral openings 19, which are provided in the side walls 20 of the drum casings and which extend as slots adjacent the bottoms of the casings exposing about one-third of the periphery of each disk. The cotton stripped from the picker stems by the doffers 16 is delivered to a conveyer 20' which moves the cotton toward collection receptacles 21. A more detailed explanation of the structure and operation of the picking devices will be found below.

Figure 1:
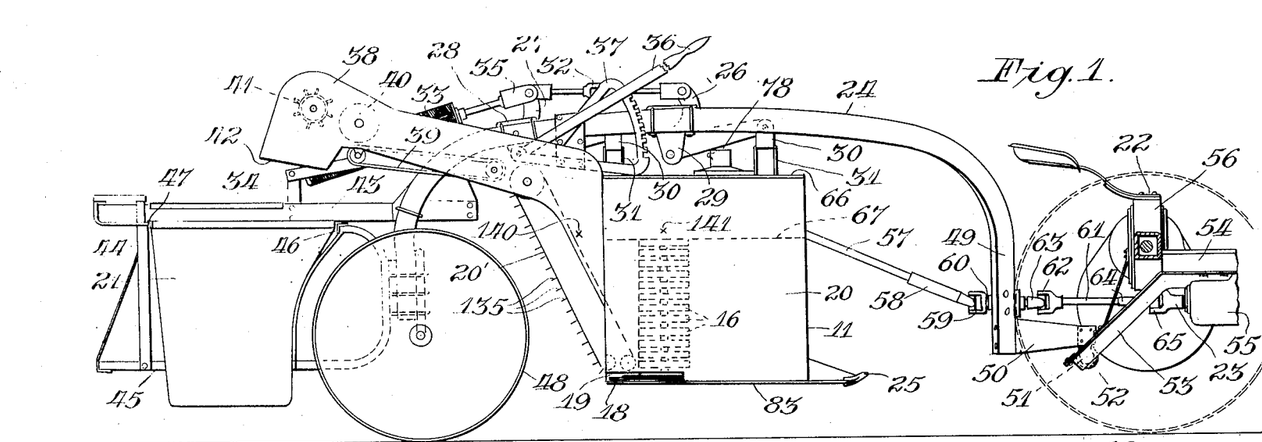
Figure 1 is a side elevation.

Referring to Figure 1 of the drawings, the picker mechanism, including the picker drums and the drum casings 10 and 11, is suspended from a wheel supported frame which is directly connected at its forward end to a tractor 22. As also illustrated in this figure of the drawings, power is transmitted from the power take-off 23 of the tractor to the operating parts of the picker mechanism.

The illustrative picker mechanism is preferably connected with an arched frame 24 so that it may be adjusted vertically with respect to the frame and the ground. In Figure 1 of the drawings, the picker mechanism is shown in elevated or in inoperative position. In operation, the picker mechanism is lowered so that the shoes 25 ride along the surface of the ground. The picker mechanism is also preferably mounted so that it is free to swing laterally with respect to the frame 24. The devices whereby the picker mechanism is mounted in the manner above indicated include bell cranks 26 and 27 pivotally mounted upon fixed frame supports 28 and 29. The forwardly projecting ends of the bell cranks are pivoted on transverse axes to yokes 30 and 31, which are pivotally associated with the picker mechanism on an axis running longitudinally of the machine, or in the direction of the path of travel of the machine. The upper ends of the bell cranks 26 and 27 are preferably adjustably connected by a turnbuckle 32, and, for the purpose of substantially counterbalancing the picker mechanism when it is in operation, springs 33 are provided. These springs are anchored to a fixed part of the machine herein illustrated as the upright 34. The other ends of the springs are associated with a yoke 35 which is pivoted to the rear bell crank, as clearly shown. The bell cranks are adjusted by means of the lever 36 which is preferably non-rotatively mounted about the axis of one of the bell cranks. A fixed detent bracket 37 cooperates with the lever 36 to hold the latter in any desired position.

The machine illustrated in Figure 1 of the drawings includes a rearwardly and upwardly extending casing 38, which partially houses the elevator 20 and is preferably rigidly secured to a drum casing so as to swing with the picker mechanism. There is preferably such a casing on each side of the frame, the relative positions of the casings being shown in Figure 2 of the drawings. Referring again to Figure 1, a conveyer 39 moves the cotton rearwardly thru the casing 38 and toward a carding wheel 40, which elevates the cotton into such a position that it may be acted upon by blasts of air produced by the blower 41. From the conveyer 38 the cotton drops downwardly from the spout 42 into the collection receptacle 21. This receptacle is associated with the frame in such a way that it may be easily replaced by an empty receptacle. In the illustrative structure, rearward frame extensions 43 together with the frame work comprising members 44 and 45 afford supports for parallel tracks 46 and 47 upon which the receptacle may be slidably supported.

It will be noticed from an inspection of Figure 1 that the frame 24 is upwardly arched, the downwardly extending, rearward leg of the frame being supported by ground wheels 48, and the forward downwardly extending leg of the frame 49 carrying a bracket 50, which is preferably provided with a pivotal supporting member 51 received by a correspondingly shaped socket 52, which is in turn carried by a frame extension 53 of the tractor. The extension 53 is secured to the main frame 54 of the tractor at a point in proximity to the transmission 55 and extends underneath the rear axle housing 56.

The transmission devices for connecting the power take-off 23 of the tractor with the picker mechanism include telescoping shaft sections 57 and 58 extending from a driven element in the picker mechanism to a universal joint 59, a part of which is non-rotatively mounted upon a short drive shaft 60 journaled within the downwardly extending leg 49 of the cotton picker frame. The forward end of the shaft 60 is connected to a telescoping shaft section 61 by means of universal joint members 62 and 63. The shaft section 61 cooperates with the telescoping section 64 which is connected with the power take-off 23 by a universal joint device 65.

The foregoing general organization is covered by copending patents to Johnston et al. Nos. 1,727,708 and 1,727,709 of September 10, 1929.

Beneath the upper wall 66 of the picker mechanism is an intermediate horizontal wall 67. Between these two walls suitable gearing for driving the picker mechanism and the doffer is provided. Below the wall 67 the picker stems are located as is clearly indicated in Figure 4 of the drawings. The picker stems are carried by vertically mounted picker bars 68. These bars are preferably tubular in form thruout their main portions. The parts of these bars which extend between the drum head 69 and the lower drum head 70 constitute housings for suitable gearing and shafting for driving the picker stems.

Figure 4:
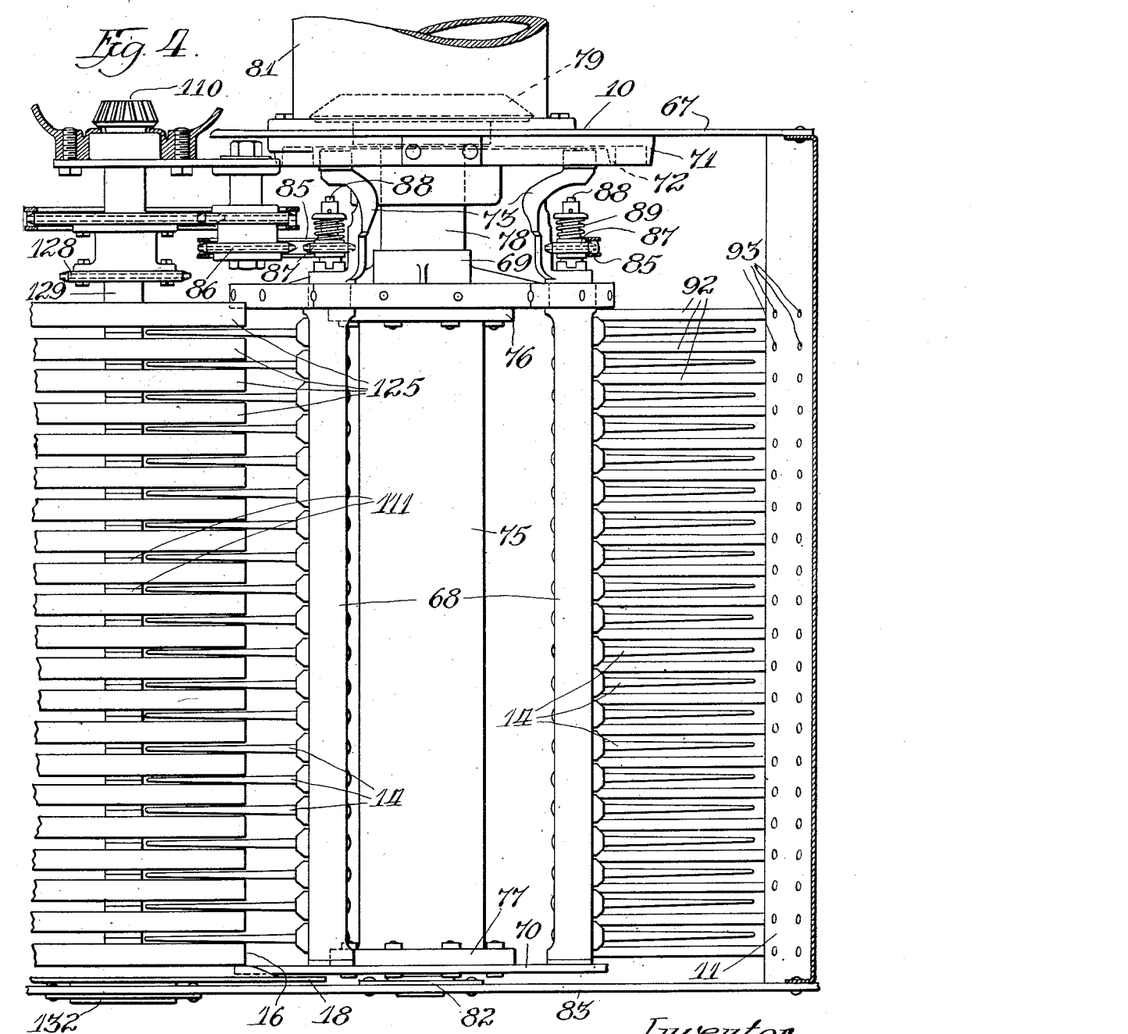
Figure 4 is a view somewhat in the nature of a broken sectional view through the picker drum casing, the casing being broken away to disclose the arrangement of the picker stems and the doffers, and their associated operating devices.

The picker bars are movably mounted in the drum heads 69 and 70 and are caused to oscillate relative to the heads 69 and 70 by the cam mechanism including an outer cam track 71 and an inner cam track 72 both of which are preferably secured to the under side of the wall 67 as illustrated in Figure 4 of the drawings. The angular positions of the picker bars are changed by the cam arms 73 which are preferably formed integral with the picker bars and are extended upwardly so that their upper ends will be interposed between the cam tracks 71 and 72. The upper ends of these arms are advantageously engaged with the cam tracks thru suitable rollers rotatably mounted upon the arms. The cam arms 73 are offset relative to the longitudinal axes of the picker bars for a purpose hereinafter specified.

The drum heads 69 and 70 are held rigidly spaced and in the same positions relative to each other by steel columns 75. Each column 75 is provided with integral upper and lower flanges 76 and 77 respectively, bolted as shown to the drum heads. The upper drum head is nonrotatively secured to the driving shaft 78 which is preferably supported from an upper position. The shaft 78 is rotated by a beveled gear 79 which is connected with the drive shaft 57 by means of suitable driving devices. The gear 79 is enclosed by a cylindrical structure 81 which also acts as a support extending between the walls 66 and 67.

In Figure 4 of the drawings several of the picker bars have been eliminated for the purpose of clarity of disclosure but it will be appreciated that there is a row of picker bars all around the picker drum structure. This is indicated in Figure 2 of the drawings. The lower end of the picker drum is centrally held and guided by means of a pilot bearing 82 fixed in the lower wall 83 of the picker casing. It will be appreciated that, as the picker bars are carried around the vertical axis of the picker drum, the picker stems will be projected at the various angles which are illustrated in Figure 2 of the drawings. During the orbital movement of the picker bars the picker stems are caused to rotate by a sprocket chain 85 engaged with a driving sprocket 86 and with driven sprockets 87 mounted upon the upper ends of the shafts 88 which extends thru the picker bars and are rotatively connected with the separate picker stems. The driven sprockets 87 are preferably connected with shafts 88 by releasable driving devices such as the friction slip clutches 89 illustrated in Figure 4 of the drawings. In case the picker stems of any picker bar encounter abnormal resistance its slip clutch will allow movements of its sprocket 87 without damage to any part of the structure. The cam arms 73 are offset at the tops of the picker bars so as to allow adequate space for the sprockets 87 and a sprocket chain 85.

As the machine is drawn along the ground the branches of the plants are received within a central passageway L located between the two casings of the picker mechanism. Low hanging branches of the plants are picked up by the shoes 25 and are directed by the guides 90 toward the passage-way L. The upper parts of the plants are directed into the same passage-way by the compression bars 91 and 92. There is a series of these bars on each side of the passage-way L. The bars in each series are preferably vertically spaced a sufficient distance to receive the picker stems of any single horizontal series of the adjacent picker drum. The bars are secured at their forward ends to the casing, as indicated at 93, and at their rearward ends they are preferably flattened and widened so as to have the shape indicated at 94 in Figure 2 of the drawings. They are held in properly vertically spaced position by an upright 95, there being interposed between the rearward ends of the bars 91 spacers 96 having guides 97 rigid therewith.

The cam tracks 71 and 72 act to vary the angular projection of the picker stems, as indicated in Figure 2 of the drawings. Referring to the picker drum indicated at K in this figure of the drawings, the picker stems move from the position A in a clockwise direction thru positions D, G and J. At the position A, a picker stem is about to pass between adjacent compression bars 91. As it enters the passage-way L, its angularity is gradually changed and it is projected into the cotton plants, thereby assuming such a position as that indicated at B. The succeeding portion of the cam cooperating with the rotation of the picker drum K and the shaft 78 brings the picker stem to the position C wherein it is projected to its maximum extent across the plant passage-way L.

As a picker stem passes from the position B to the position D, it is rotated by the apparatus above described so as to wind up mature cotton and pull it from the plant. During the rotation of the picker stems and the winding up of the cotton thereon, the plants are acted upon by spring devices 98 which promote the gathering of a high percentage of the cotton from the plants.

Referring again to Figure 2 of the drawings, as the picker stems leave the position indicated at D, they are withdrawn from the plant passage-way and their angularity is gradually changed so that they approach the doffer 16 in substantially tangential relationship thereto. Before the picker stems pass between adjacent parts of the doffer 16, their winding up rotation is stopped. Immediately after the picker stems enter the space between adjacent parts of the doffer 16 they have a position such as that indicated at E.

The next effect of the cam and the picker drum upon the picker stems is to withdraw the picker stems in the direction of their length and toward their butt ends from the doffer. There is thus produced an action which promotes effective stripping of the cotton from the picker stem. This action will be seen from an inspection of the positions indicated at E and F in Figure 2 of the drawings.

As the picker stems progress from the doffer and around to positions wherein they again enter the plant passage-way, they pass successively thru positions G, H and J. During this movement the cam produces a gradually accelerated change and it is so arranged as to avoid any snapping movement of the picker stems by reason of irregular acceleration which causes breakage of the picker stems and abnormal wear upon other parts of the members.

While the action of the picker stems has been described with reference to one particular picker drum, it will be understood that the picker drums are substantially alike and that the description of the operation of one will also fit the operation of the other. As the picker stems of the opposed drums pass thru the central portion of the plant passage-way L they are overlapped, the picker stems being so arranged at this period in the operation of the picker mechanism that all the picker stems are in rectangular arrangement in vertical section. In other words, the picker stems are located at the vertices of the squares with relation to each other, the picker stems in the vertical row indicated at 99 being substantially the same distance from each other as each picker stem in that row is from the corresponding picker stem in row 100. Stated in another way, if we select two adjacent picker stems in the vertical row 99, they are at the same levels as two adjacent picker stems in the row 100, and all four of these picker stems are arranged at the vertices of a square. Under some conditions it has been found that an effective arrangement of this nature obtains when the sides of the square are approximately 1⅛ inches. Under these conditions there is a minimum of opportunity for a cotton boll to escape the gathering or winding up action of the picker stems. Figure 7 of the drawings indicates an arrangement of picker stems similar to that just described.

The position of the doffer of the illustrative machine is indicated in Figures 1, 2, 3 and 4 of the drawings. Referring to Figure 2, it will be noted that the doffer is interposed between the conveyer 20' and the adjacent set of picker stems. A passage-way for the cotton from the picker stems to the conveyer is formed between the members 94 on one side and the members of the doffer on the other side. The doffer members which constitute one wall of this passage-way are clearly indicated in the drawings as disk-like structures mounted in vertically alined positions so as to form a substantially cylindrical unit. As indicated in Figures 1, 3 and 5 of the drawings, these disk-like structures are mounted upon a vertical shaft 110, the shaft being preferably splined so as to non-rotatively mount the structures.

Assignee's copending application Serial No. 166,829 filed February 9, 1927, covers the cotton doffing mechanism herein disclosed and the relation of the picking mechanism thereto.

Figure 5:
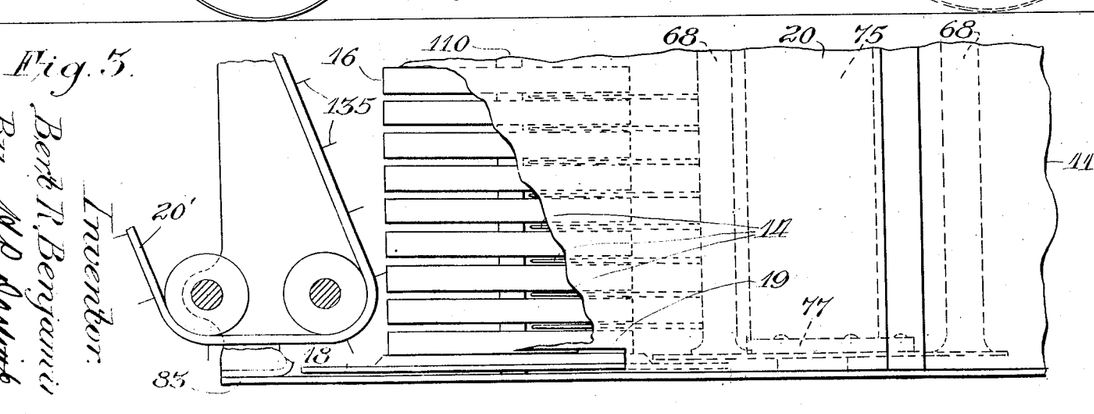
Figure 5 is partly a side elevation and partly a vertical section thru the doffer mechanism and the separator.
Figure 6:
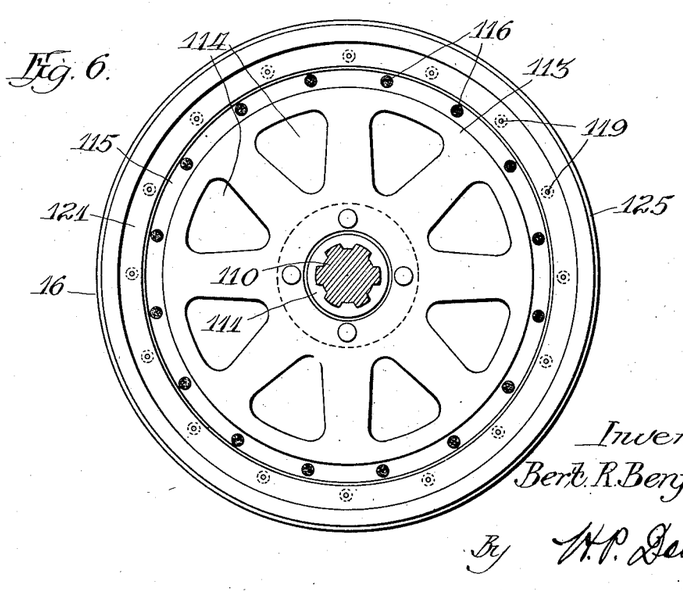
Figure 6 is a plan of one of the units of the doffer.

Referring to Figure 5 of the drawings, each disk-like structure of the doffer comprises a hub 111 having an annular flange 112 to which a disk 113 is secured. As indicated in Figure 6 of the drawings, this disk is preferably formed as a wheel-shaped element having openings 114 therethru. The central disk-like structure illustrated in cross section in Figure 5 of the drawings is formed with an upwardly presented annular channel 115. This structure permits of desirable action of brushes 116, which are illustrated in Figure 5 as being individually cylindrical in form and mounted in the disk 113 in a circular series extending upwardly thru the channel 115 to positions preferably above the upper surface of the disk 113.

On the face of the disk 113 opposite from the channel 115 is a rib 117 for affording sufficient rigidity of the structure and enabling the brushes 116 to be securely mounted in the disk. Externally of the rib 117 the disk 113 is provided with an annular channel 118 opening downwardly of the disk and receiving brushes 119 which are mounted in the disk in a circular series, as are the upwardly extending brushes 116. The brushes 119 preferably extend downwardly beyond the lower surface of the disk 113 and beyond the lowermost limit of the rib 117. Directly above the channel 118 each disk 113 is provided with a second rib 120.

It will also be noted from an inspection of Figure 5 of the drawings that the oppositely extending brushes on adjacent doffer units are offset circumferentially of the doffer. This arrangement promotes effective action of the brushes upon the picker stems 14, prolongs the life of the brushes, and otherwise improves the operation of the machine. The manner in which the picker stems pass between adjacent units of the doffer is indicated in Figure 5, the positions of the picker stems being illustrated in dotted lines at the right of that figure.

The marginal portions 121 of the disk-like structures of the doffer are preferably formed with a central outwardly presented groove 122 cooperating with the ribs 123 and 124 to form adequate anchorage for the annular bands 125. These bands are preferably formed of an elastic, resilient and moldable material fashioned so that they will become firmly seated around the disks 113 when they are forced into that position. The band on the upper disk-like structure is protected by a flange 126 extending over its upper surface.

In the assembly of the illustrative doffer the disk-like structures are placed upon the shaft 110, the lowermost of those structures contacting with an abutment 127 preferably integrally formed upon the lower end of the shaft 110. The hubs of the respective structures abut each other, as illustrated in Figure 5 of the drawings, thus maintaining the individual structures at the correct positions relative to the adjacent structures. After all of the units of the doffer are placed in position upon the shaft 110 the driving sprocket 128 with its splined hub 129 is put in position at the upper end of the shaft. All of the above mentioned units are then secured in their operative positions by a nut 130 which is threaded upon the upper end of the shaft 110.

The abutment 127 at the lower end of the doffer structure is preferably circular in form so as to be tightly received within the inner race 131 of a pilot bearing mounted within a removable cap 132. This cap is preferably screw-threadedly mounted within the lower wall 83 of the picker mechanism so as to be removable downwardly.

A separator 18 is preferably located at the lower end of the doffer. In the illustrative machine, this separator takes the form of a disk non-rotatively secured to the lowermost disk-like structures of the doffer, as clearly indicated in Figure 5 of the drawings. A downwardly extending, annular flange 134 on the lowermost of the disk-like structures of the doffer centers the separator 18 as well as protects the pilot bearing. The separator is preferably circular in form and extends to a substantial distance beyond the peripheries of the disk-like structures of the doffer. It also has its outer portions mounted in close proximity to the lower wall 83 of the picker mechanism. As shown in Figures 1 and 3 of the drawings, the disk 18 is so mounted that the upper surface of its outer portion is below the upper wall of the opening 19 thru which the disk throws dirt and trash, such as bits of stalk and leaves, as the latter come in contact with the disk after their removal with the cotton from the picker stems 14. In practice a substantially continuous stream of extraneous material is ejected from the picker mechanism by the disk 18. The conveyer 20' acts as a wall from which particles of extraneous material rebound and fall to the disk 18 after they are thrown against the conveyer by the doffer. The cotton is caught by the conveyer spikes 135 and held so as to be elevated and moved toward the collection receptacle 21. This action of the doffer in throwing material against the conveyer 20' may be better understood when reference is had to Figure 2 of the drawings. The doffer is rotating in a counter-clockwise direction, as indicated by the arrow 136. The material collected by the picker stems is thus caused to be substantially tangentially acted upon by the doffer so as to move in the direction indicated by the arrow 137. The distance which the material travels from a picker stem to the conveyer at a level adjacent the bottom of the doffer is indicated by the distance between the crosses 138 and 139. When Figure 1 of the drawings is referred to it will be appreciated that the distance of travel of the stripped material is greater near the top of the doffer than near the bottom, the distance of travel of the material near the top of the doffer being substantially indicated by the distance between the crosses 140 and 141 of Figure 1. These attributes of the illustrative machine promote desirable separation of the cotton and trash which is gathered along therewith from the cotton plants.

Considering the action of the doffer, the separator, and the elevator at the bottom of the doffer structure, stalk portions and bits of trash having like properties are either dropped directly to the separator disk 18, or caused to rebound from the conveyor 20' to the disk 18. They are then carried around the disk and thrown outwardly thru the opening 19. Such accumulations of cotton as may come into contact with the disk will be carried around until they are caught by the upwardly traveling spikes 135 of the conveyer, or caused to rebound upwardly from the disk toward the conveyer. They will thus be removed from the mass of material carried around by the disk, thereby promoting desirable separation of the cotton from the trash.

As the wound up cotton with its enclosed trash is removed from the picker stems much of the cotton will be thrown in a direction diverging rearwardly from the direction of movement of bits of trash gathered along with the cotton, as the trash, being heavier, will be thrown off first. As the distance traveled by the cotton and trash increases, their divergence increases correspondingly so that separation is promoted. This separating action is much greater adjacent the top of the doffer than adjacent the disk 18, thus offsetting greater separation which takes place at the bottom of the doffer due to the adjacent location of the separator disk 18.

While the invention has been described with relation to a particular mechanism, it is to be understood that the invention is not limited thereto, but that it is susceptible of use in various combinations and sub-combinations coming within the scope of the appended claims.

What is claimed is:

1. A cotton picker comprising the combination of picking mechanism, means for doffing cotton from said mechanism, means for preventing the escape of cotton under operation, and separate means for expelling trash during operation.

2. A cotton picker comprising the combination of picking mechanism, a doffer, a casing for the picking mechanism, and a rotating disk for expelling trash such as leaves and bits of stalks from the casing.

3. A cotton picker comprising the combination of picking mechanism, a conveyor, a doffer for stripping the cotton from the picking mechanism and propelling it to the conveyer, and means operating beneath the picking mechanism and the doffer for expelling trash from the picker.

4. A device of the class described comprising, in combination, a traveling main frame, casings suspended from the main frame, cotton picking devices mounted in said casings, a doffer in each casing for stripping the cotton from the picking devices, a cotton elevator for each casing, and a separator carried by each casing for expelling leaves and trash from the casing.

5. A device of the class described comprising, in combination, cotton picking mechanism, a casing for said picking mechanism, an elevator, a doffer for stripping cotton from the picking mechanism and throwing it upon the elevator, and a rotating member extending below the space between the elevator and the doffer for expelling trash from the casing.

6. A cotton picker comprising a battery of picker stems, a plurality of doffer disks for stripping the cotton from the picker stems, a casing for said picker stems and doffer disks, the casing being provided with a slot in its outer wall, and a separator disk rotating with the doffer disks for expelling trash thru the slot.

7. A cotton picker comprising picking mechanism, doffers, casings for preventing the escape of cotton from the doffers and picking mechanism, and means movable with the doffers for expelling trash from the casings.

8. A cotton picker comprising, in combination, picking mechanism, a doffer, a casing for the picking mechanism and the doffer, and a disk moving with the doffer for expelling trash such as leaves and bits of stalk from the casing.

9. A device of the class described comprising, in combination, cotton picking mechanism, a casing for said picking mechanism, a cotton delivery conveyer, a doffer for stripping the cotton from the picking mechanism and throwing it upon the conveyer, and means beneath the doffer and the conveyer for expelling trash from the casing.

10. A cotton picker comprising, in combination, a battery of picker stems, a rotating doffer for stripping the cotton from the picker stems, a casing for said picker stems and the doffer, the casing being provided with a slot in its outer wall, and a separator disk rotatable beneath the doffer and the picker stems so as to expel trash thru the slot.

11. A cotton picker comprising, in combination, picking mechanism, a cotton delivery conveyer, a doffer rotatable upon a vertical axis and operating to strip the cotton from the picking mechanism and throw it on the conveyer, and a separator below the conveyer and the doffer for expelling trash from the picker 12. The combination set forth in claim 11 characterized by a doffer comprising a plurality of flat circular structures between which parts of the picking mechanism pass.

13. The combination set forth in claim 11 characterized by means for moving parts of the picking mechanism thru the doffer so that those parts extend toward and point toward the conveyer while they are passing thru the doffer.

14. The combination set forth in claim 11 characterized by means for causing parts of the picking mechanism to approach the side of the doffer which is moving toward the conveyer.

15. A cotton picker comprising rotary picker stems, rotary means for stripping the cotton from the picker stems, a casing for substantially enclosing the picker stems and the stripping means, and continuously acting means rotatable with said stripping means for expelling trash and dirt from the casing.

16. A cotton picker comprising, in combination, picking mechanism, means for removing picked cotton from the picking mechanism, a casing substantially enclosing the picking mechanism and said means, and a centrifugally acting disk for expelling trash from the casing.

17. A cotton picker having cotton picking means and a centrifugal separator for ejecting trash and dirt contained in the picked cotton.

18. A cotton picker comprising, in combination, cotton picking means, a rotary doffer for removing the cotton from the picking means, a conveyer, and a separator comprising a disk located beneath the doffer and extending radially beyond the same and in proximity to the conveyer.

19. A machine of the class described comprising in combination, cotton picking means, a rotary doffer for removing the cotton from the picking means, and a centrifugal separator movable with the doffer and located therebeneath.

20. A machine of the class described comprising, in combination, cotton picking means, a doffer for removing the cotton from picking means, a conveyor for moving the cotton away from the doffer and toward the delivery point, and a separator located operatively between the doffer and the conveyor for separating trash from the cotton and assisting in the delivery of cotton to the conveyor.

21. In a machine of the class described, cotton picking means, a conveyor for transferring the doffed cotton to a point of delivery, and a separator acting in conjunction with the doffer and the conveyor to move the cotton in one direction toward a point of delivery and to move trash such as leaves and bits of stalk in a divergent direction whereby the cotton and trash are separated.

In testimony whereof I affix my signature.

BERT R. BENJAMIN.